United States Patent
Huang et al.

(10) Patent No.: US 8,493,515 B2
(45) Date of Patent: *Jul. 23, 2013

(54) ADAPTER

(75) Inventors: Szu-Lun Huang, New Taipei (TW); Chih-Huang Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/442,959

(22) Filed: Apr. 10, 2012

(65) Prior Publication Data

US 2013/0162909 A1    Jun. 27, 2013

(30) Foreign Application Priority Data

Dec. 23, 2011  (TW) .............................. 100148484 A

(51) Int. Cl.
*H04N 5/63*        (2006.01)
(52) U.S. Cl.
USPC ......................................................... 348/730
(58) Field of Classification Search
USPC ...... 348/572, 725, 731, 552, 553, 730; 307/3, 307/22, 26
See application file for complete search history.

(56) References Cited

U.S. PATENT DOCUMENTS

| | | | | |
|---|---|---|---|---|
| 6,226,038 B1 * | 5/2001 | Frink et al. | .................... | 348/443 |
| 6,882,362 B2 * | 4/2005 | Sato | ........................ | 348/222.1 |
| 7,567,269 B2 * | 7/2009 | Sakano et al. | ............. | 348/14.01 |
| 7,916,849 B2 * | 3/2011 | Bathurst et al. | .......... | 379/202.01 |
| 2005/0088541 A1 * | 4/2005 | Sato | ........................ | 348/231.99 |
| 2007/0087722 A1 * | 4/2007 | Ichihara | .................... | 455/343.1 |

* cited by examiner

*Primary Examiner* — Paulos M Natnael
(74) *Attorney, Agent, or Firm* — Altis Law Group, Inc.

(57) ABSTRACT

A television adapter includes first and second conversion circuits, a switch unit, and a high definition television (HDTV) interface. The first conversion circuit includes a digital to analog (D/A) converter and a coupler. The second conversion circuit includes an analog to digital (A/D) converter and a decoupler. When the switch unit connects the first conversion circuit to the HDTV interface, the D/A converter converts a first digital signal from the HDTV interface into a first analog form data. The coupler couples the first analog form data to a first alternating current (AC) voltage. When the switch unit connects the second conversion circuit to the HDTV interface, the decoupler decouples and separates a second AC voltage into a second analog form data. The A/D converter converts the second analog form data into a second digital signal, and outputs the second digital signal to the HDTV interface.

5 Claims, 5 Drawing Sheets

ADAPTER

CROSS-REFERENCE TO RELATED APPLICATIONS

Relevant subject matter is disclosed in a co-pending U.S. patent applications (application Ser. Nos. 13/442,937, 13/442,945, 13/442,953, 13/442,956, 13/442,965, 13/442,970, 13/442,977, 13/442,981, 13/442,988, and 13/443,873) having the same title and assigned to the same assignee as named herein.

TECHNICAL FIELD

The present disclosure relates to adapters, and particularly, to a television adapter.

DESCRIPTION OF RELATED ART

When high definition videos from set-top box are shared by many televisions, a high definition dividing or splitting device needs to be connected to each television through cables to share the high definition videos from the set-top box to the televisions. This is inconvenient.

BRIEF DESCRIPTION OF THE DRAWINGS

Many aspects of the present embodiments can be better understood with reference to the following drawings. The components in the drawing are not necessarily drawn to scale, the emphasis instead being placed upon clearly illustrating the principles of the present disclosure. Moreover, in the drawings, all the views are schematic, and like reference numerals designate corresponding parts throughout the several views.

DETAILED DESCRIPTION

Figure 1:
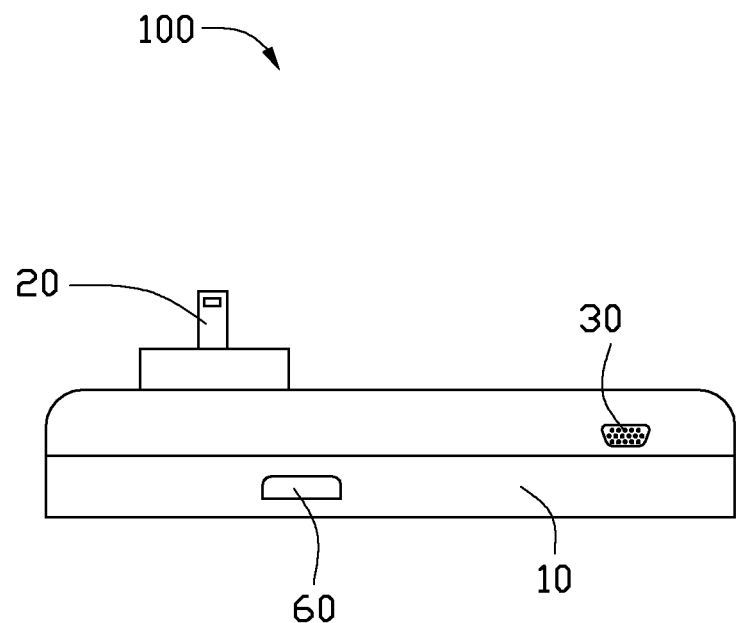
FIG. 1 is a schematic view of an exemplary embodiment of a television adapter, wherein the television adapter includes a voltage conversion circuit.
Figure 2:
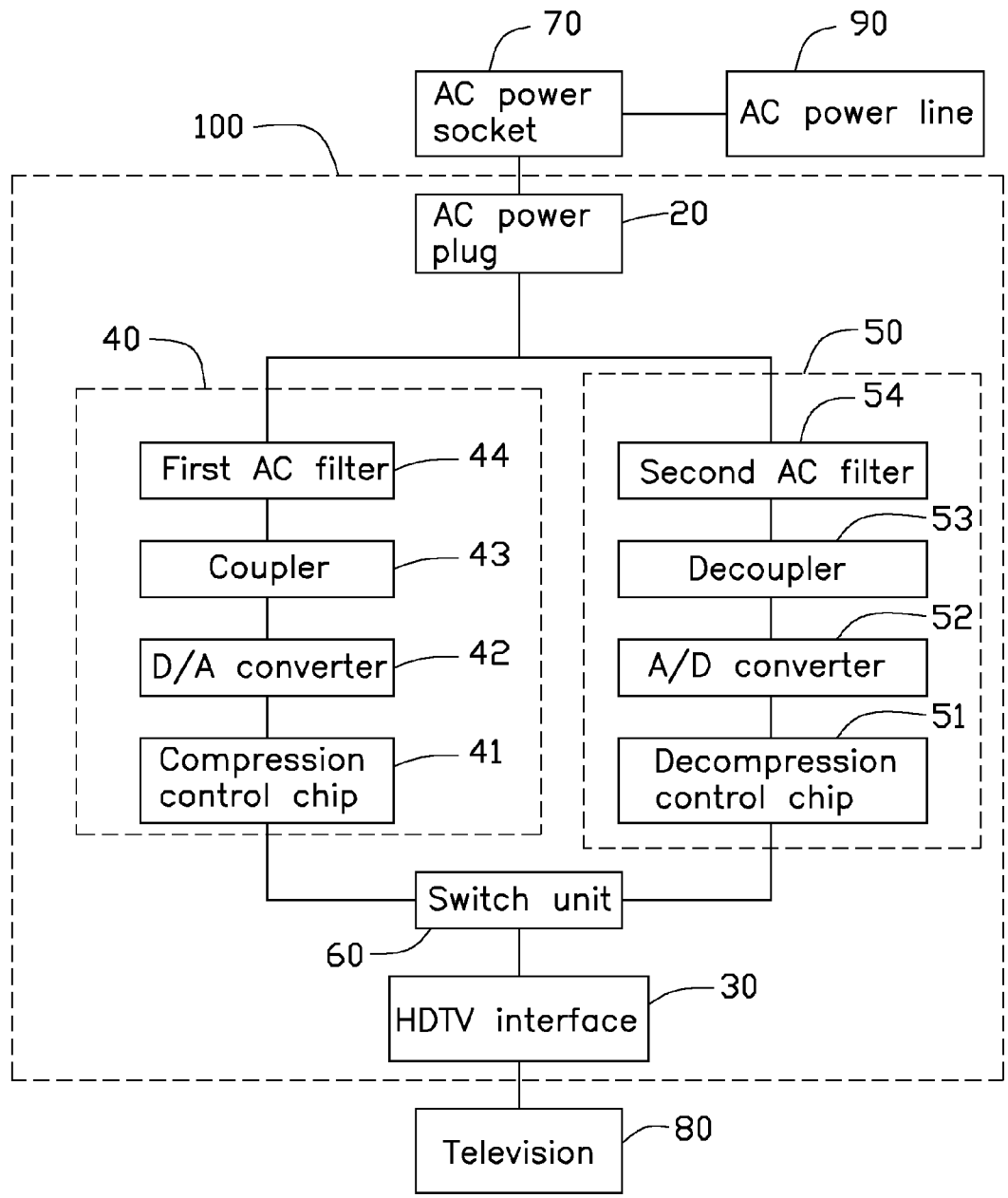
FIG. 2 is a block diagram of the television adapter of FIG. 1.
Figure 3:
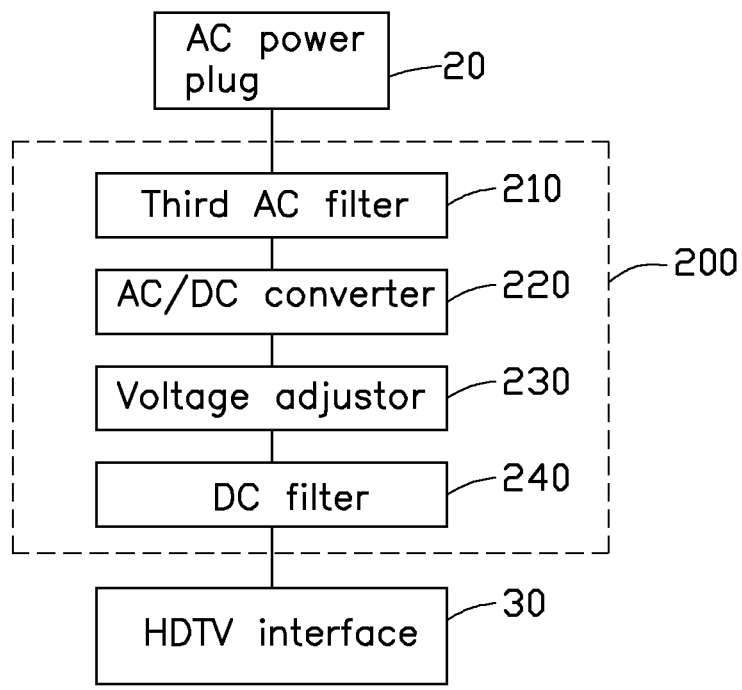
FIG. 3 is a block diagram of the voltage conversion circuit of FIG. 1.

The disclosure, including the accompanying drawings in which like references indicate similar elements, is illustrated by way of example and not by way of limitation. It should be noted that references to "an" or "one" embodiment in this disclosure are not necessarily to the same embodiment, and such references mean at least one.

Referring to FIGS. 1 to 4, an embodiment of a television adapter 100 includes an enclosure 10, an alternating current (AC) power plug 20, a high definition television (HDTV) interface 30, a first conversion circuit 40, a second conversion circuit 50, a switch unit 60, and a voltage conversion circuit 200. The AC power plug 20 is mounted on the enclosure 10 to be connected to an AC power socket 70. The HDTV interface 30 is mounted on the enclosure 10 to be connected to a television 80 or a set-top box 500. The switch unit 60 is connected between the HDTV interface 30 and each of the first and second conversion circuits 40 and 50, to connect either the first conversion circuit 40 or the second conversion circuit 50 to the HDTV interface 30. When the set-top box 500 connected to the television adapter 100 functions as a signal transmission terminal, the switch unit 60 connects the first conversion circuit 40 to the HDTV interface 30. When the television 80 connected to the television adapter 100 functions as a signal receiving terminal, the switch unit 60 connects the second conversion circuit 50 to the HDTV interface 30. In the embodiment, the switch unit 60 is a manual switch.

The first conversion circuit 40 includes a compression control chip 41, a digital to analog (D/A) converter 42, a coupler 43, and a first AC filter 44. The second conversion circuit 50 includes a decompression control chip 51, an analog to digital (A/D) converter 52, a decoupler 53, and a second AC filter 54.

The compression control chip 41 is connected to the switch unit 60. The D/A converter 42 is connected between the compression control chip 41 and the coupler 43. The coupler 43 is connected to the AC power plug 20 through the first AC filter 44. The AC power plug 20 is also connected to the decoupler 53 through the second AC filter 54. The A/D converter 52 is connected between the decoupler 53 and the decompression control chip 51. The decompression control chip 51 is connected to the switch unit 60.

The voltage conversion circuit 200 includes a third AC filter 210, an alternating current to direct current (AC/DC) converter 220, a voltage adjustor 230, and a DC filter 240. In view of the likelihood of random noise in the commercial AC voltage, the third AC filter 210 is connected to the AC power plug 20 to receive the AC voltage, and filters the noise from the AC voltage. The AC/DC converter 220 is connected between the third AC power filter 210 and the voltage adjustor 230, to convert the AC voltage into a DC voltage, and output the DC voltage to the voltage adjustor 230. The voltage adjustor 230 adjusts the received DC voltage. In view of the possibility of random noise in the adjusted DC voltage, the DC filter 240 is connected between the voltage adjustor 230 and the HDTV interface 30 to filter the adjusted DC voltage and output the filtered DC voltage to the HDTV interface 30, to power the television 80 or the set-top box 500 connected to the HDTV interface 30.

Figure 4:
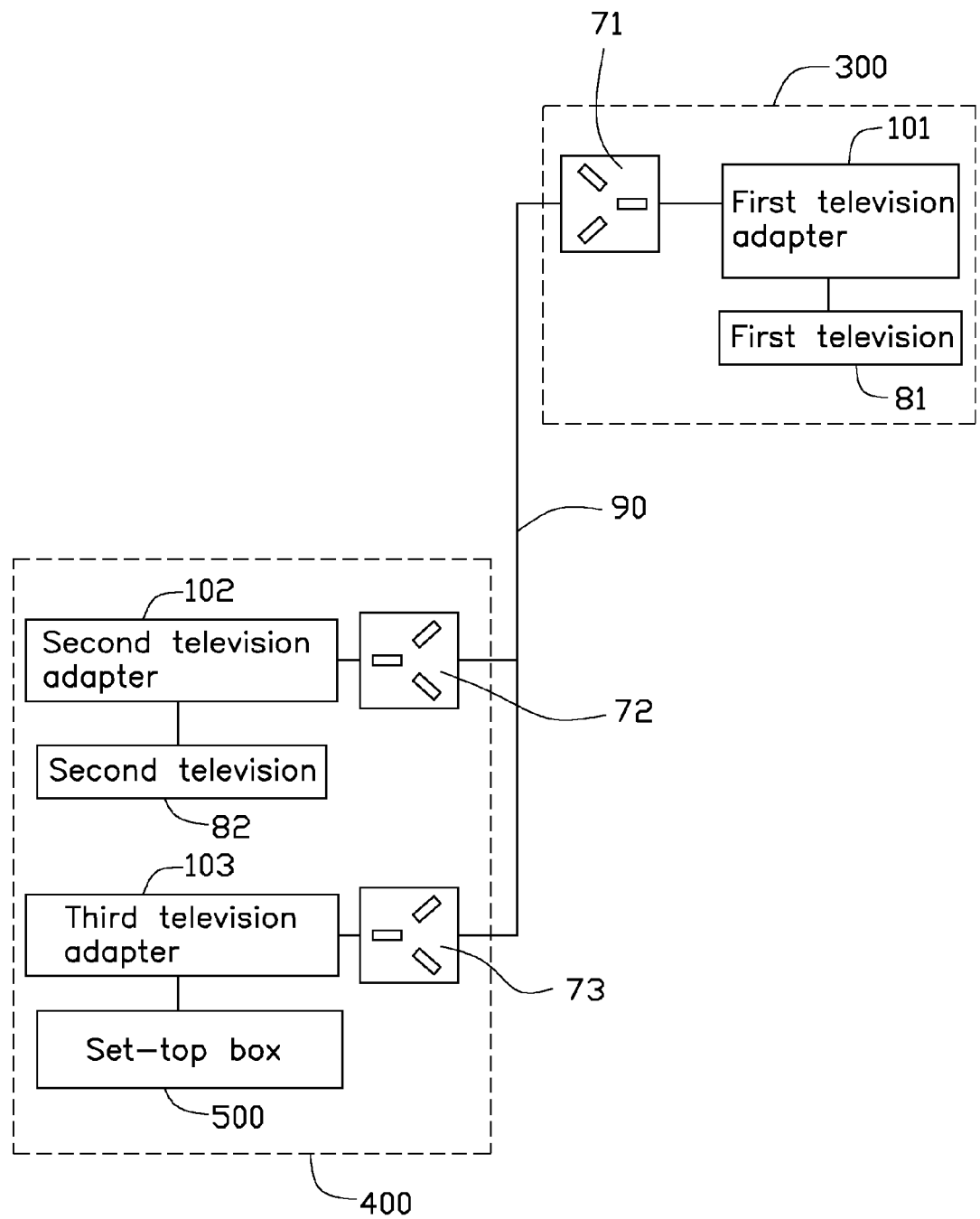
FIG. 4 is a schematic view of the television adapter communicating with another two television adapters and a set-top box.
Figure 5:
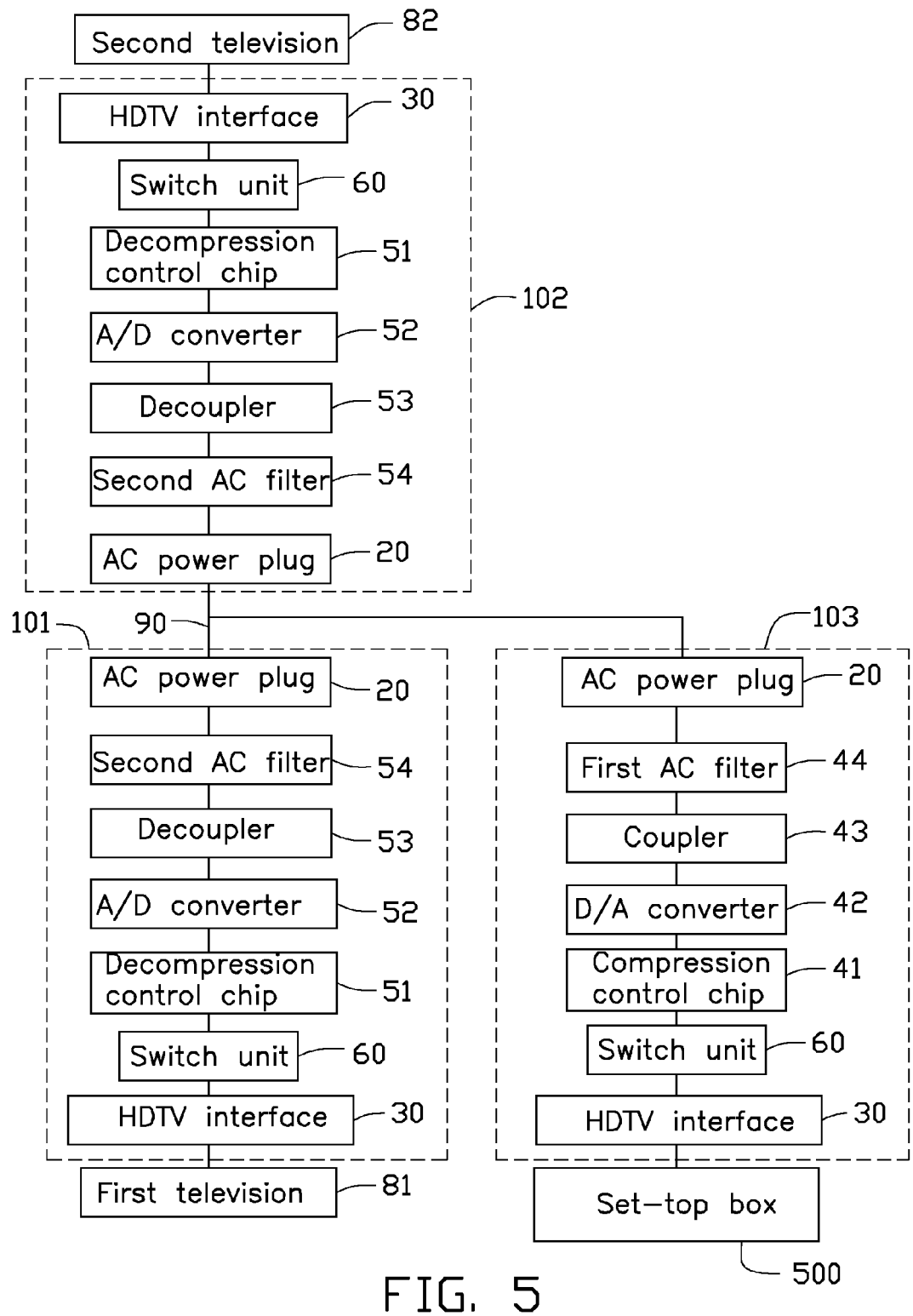
FIG. 5 is a block diagram of the systems of FIG. 4.

Referring to FIGS. 4 and 5, an example describes a working principle of the television adapter 100. A first television adapter 101 is inserted into a first AC power socket 71 in a first room 300. A second television adapter 102 is inserted into a second AC power socket 72 in a second room 400. A third television adapter 103 is inserted into a third AC power socket 73 in the second room 400. The first AC power socket 71 is connected to the second and third AC power sockets 72 and 73 through a commercial AC power line 90. The first to third television adapters 101-103 have the same function and structure as the above-mentioned television adapter 100. A first television 81 is connected to the HDTV interface 30 of the first television adapter 101 in the first room 300. A second television 82 is connected to the HDTV interface 30 of the second television adapter 102 in the second room 400. The set-top box 500 is connected to the HDTV interface 30 of the third television adapter 103 in the second room 400.

When the set-top box 500 in the second room 400 functioning as a signal transmission terminal communicates with the second television 82 in the second room 400 functioning as a signal receiving terminal and with the first television 81 in the first room 300 functioning as a signal receiving terminal, the switch unit 60 of the third television adapter 103 is switched to connect the first conversion circuit 40 to the HDTV interface 30 of the third television adapter 103, the switch unit 60 of the second television adapter 102 is switched to connect the second conversion circuit 50 to the HDTV interface 30 of the second television adapter 102, and the switch unit 60 of the first television adapter 101 is switched to connect the second conversion circuit 50 to the HDTV interface 30 of the first television adapter 101.

The set-top box 500 outputs a digital signal representing audio and video data to the HDTV interface 30 of the third television adapter 103. The compression control chip 41 of the third television adapter 103 receives the digital signal representing audio and video data through the switch unit 60, compresses the digital signal representing audio and video data into one or more data packets, and outputs the one or more data packets to the D/A converter 42. The D/A converter 42 converts the one or more data packets into an analog form (analog form data) suitable for transmission over an AC voltage functioning as a carrier wave, and outputs the analog form data to the coupler 43. The coupler 43 couples the analog form data to an AC voltage and outputs the AC voltage coupled with the analog form data to the third AC power socket 73. The first AC filter 44 filters noise from the AC voltage coupled with the analog form data, and outputs the AC voltage coupled with the analog form data to the commercial AC power line 90 through the AC power plug 20 and the third AC power socket 73.

The commercial AC power line 90 transmits the AC voltage coupled with the analog form data to the second AC filter 54 of the second television adapter 102 through the second AC power socket 72 and the AC power plug 20 in the second room 400, and to the second AC filter 54 of the first television adapter 101 through the first AC power socket 71 and the AC power plug 20 in the first room 300. The second filters 54 of the first and second television adapters 102 and 103 filter any noise from the AC voltage coupled with the analog form data, and output the filtered AC voltage coupled with the analog form data to the decouplers 53 of the first and second television adapters 101 and 102. The decouplers 53 of the first and second television adapters 101 and 102 decouple and separate the AC voltage coupled with the analog form data into the AC voltage and the analog form data, and output the analog form data to the A/D converters 52. The A/D converters 52 of the first and second television adapters 101 and 102 convert the analog form data into the one or more data packets, and output the one or more data packets to the decompression control chips 51. The decompression control chips 51 of the first and second television adapters 101 and 102 each decompress the one or more data packets into the digital signal representing audio and video data, and output the digital signal representing audio and video data to the first and second televisions 81 and 82 through the switch units 60 and the HDTV interfaces 30. Therefore, using the well-established domestic and commercial AC supply system, the first television 81 in the first room 300 and the second television 82 in the second room 400 can share the digital signal representing audio and video data from the set-top box 500 in the second room 400.

Although numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:

1. A television adapter, comprising:
    an alternating current (AC) power plug to be inserted into an AC power socket to receive a first AC voltage;
    a high definition television (HDTV) interface to be connected to a television or a set-top box;
    a first conversion circuit comprising a digital to analog (D/A) converter, and a coupler connected between the D/A converter and the AC power plug;
    a second conversion circuit comprising an analog to digital (A/D) converter, and a decoupler connected between the A/D converter and the AC power plug; and
    a switch unit connected between the HDTV interface and each of the first conversion circuit and the second conversion circuit, to connect either the first conversion circuit or the second conversion circuit to the HDTV interface;
    wherein when the switch unit connects the first conversion circuit to the HDTV interface, the D/A converter receives a first digital signal representing audio and video data output by the set-top box through the HDTV interface, and converts the first digital signal representing audio and video data into a first analog form data, the coupler couples the first analog form data to the first AC voltage, and outputs the first AC voltage coupled with the first analog form data to the AC power plug, the AC power plug transmits the first AC voltage coupled with the first analog form data to an AC power line connected to the AC power socket; and
    wherein when the switch unit connects the second conversion circuit to the HDTV interface, the decoupler receives a second AC voltage coupled with a second analog form data through the AC power plug from the AC power line connected to the AC power socket, decouples and separates the second AC voltage coupled with the second analog form data into the second AC voltage and the second analog form data, and outputs the second analog form data to the A/D converter, the A/D converter converts the second analog form data into a second digital signal representing audio and video data, and outputs the second digital signal representing audio and video data to the television through the HDTV interface.

2. The television adapter of claim 1, wherein the first conversion circuit further comprises a compression control chip, the compression control chip is connected between the switch unit and the D/A converter to receive the first digital signal representing audio and video data from the set-top box through the HDTV interface, compresses the first digital signal representing audio and video data into a first data packet, and outputs the first data packet to the D/A converter, the D/A converter converts the first data packet into the first analog form data; wherein the second conversion circuit further comprises a decompression control chip, the decompression control chip is connected between the switch unit and the A/D converter to receive a second data packet from the AC power line and decompress the second data packet into the second digital signal representing audio and video data, and outputs the second digital signal representing audio and video data to the HDTV interface through the switch unit.

3. The television adapter of claim 1, wherein the first conversion circuit further comprises an AC filter, the AC filter is connected between the coupler and the AC power plug to filter noise from the first AC voltage coupled with the first analog form data output to the AC power line.

4. The television adapter of claim 1, wherein the second conversion circuit further comprises an AC filter, the AC filter is connected between the decoupler and the AC power plug to filter noise from the second AC voltage coupled with the second analog form data from the AC power line.

5. The television adapter of claim 4, further comprising a voltage conversion circuit, wherein the voltage conversion circuit comprises an alternating current to direct current (AC/

DC) converter and a voltage adjustor, the AC/DC converter is connected between the AC power plug and the voltage adjustor to receive the first AC voltage, converts the first AC voltage into a DC voltage, and outputs the DC voltage to the voltage adjustor, the voltage adjustor adjusts the received DC voltage, and outputs the adjusted DC voltage to the HDTV interface to power the television or the set-top box.

\* \* \* \* \*